(12) United States Patent
Takanashi

(10) Patent No.: US 12,461,599 B2
(45) Date of Patent: Nov. 4, 2025

(54) DETECTION PROCESSING THAT DETECTS A NUMBER OF CONTACTS BETWEEN FINGERTIPS OF A HAND

(71) Applicant: Sony Semiconductor Solutions Corporation, Kanagawa (JP)

(72) Inventor: Shogo Takanashi, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 128 days.

(21) Appl. No.: 18/549,682

(22) PCT Filed: Feb. 15, 2022

(86) PCT No.: PCT/JP2022/005984
§ 371 (c)(1),
(2) Date: Sep. 8, 2023

(87) PCT Pub. No.: WO2022/196222
PCT Pub. Date: Sep. 22, 2022

(65) Prior Publication Data
US 2024/0160294 A1  May 16, 2024

(30) Foreign Application Priority Data
Mar. 16, 2021 (JP) .................. 2021-042870

(51) Int. Cl.
*G06T 7/246* (2017.01)
*G06F 3/01* (2006.01)
*G06T 7/521* (2017.01)
(52) U.S. Cl.
CPC .............. *G06F 3/017* (2013.01); *G06T 7/251* (2017.01); *G06T 7/521* (2017.01)

(58) Field of Classification Search
CPC ...... G06F 3/017; G06F 3/0304; G06F 3/0346; G06F 3/01; G06T 7/251; G06T 7/521; G06T 2207/30196; G06T 2207/30268; G06T 1/00; G06T 3/00
See application file for complete search history.

(56) References Cited

U.S. PATENT DOCUMENTS

2012/0202569 A1* 8/2012 Maizels .................. G06F 3/017
463/2

FOREIGN PATENT DOCUMENTS

| JP | 2000132305 A | 5/2000 |
| JP | 2013061716 A | 4/2013 |
| JP | 2014235634 A | 12/2014 |
| JP | 2015114762 A | 6/2015 |

(Continued)

OTHER PUBLICATIONS

JP2014235634A, Hoshino et al. (Eng Translation) published on Dec. 15, 2014.*

(Continued)

*Primary Examiner* — Rinna Yi
(74) *Attorney, Agent, or Firm* — Michael Best & Friedrich LLP

(57) ABSTRACT

A detection processing device according to the present technology includes a detection processing unit that inputs shape detection information that is information obtained by capturing a shape of a hand of a user in at least two or more dimensions, and detects a motion of the hand including at least presence or absence of contact between fingertips of the user on the basis of the shape detection information.

19 Claims, 13 Drawing Sheets

(56) References Cited

FOREIGN PATENT DOCUMENTS

| JP | 2017076408 A | 4/2017 |
|---|---|---|
| JP | 2018180840 A | 11/2018 |
| JP | 2019159936 A | 9/2019 |

OTHER PUBLICATIONS

JP2013061716A, Noda et al. (Eng Translation) published on Apr. 4, 2013.*
International Search Report (PCT/ISA/210), International Application No. PCT/JP2022/005984, dated Apr. 19, 2022.

* cited by examiner

DETECTION PROCESSING THAT DETECTS A NUMBER OF CONTACTS BETWEEN FINGERTIPS OF A HAND

TECHNICAL FIELD

The present technology relates to a technical field of a detection processing device and a method thereof which detect a motion of a user's hand, and an information processing system that executes processing according to manipulation input information of the user recognized from the motion of the hand.

BACKGROUND ART

Various techniques have been proposed for recognizing a non-contact manipulation by moving a hand in a predetermined mode, instead of a manipulation by a user touching a manipulation element such as various buttons, keys, dials, or a touch panel.

For example, Patent Document 1 below discloses a gesture recognition technique for recognizing characters and the like traced by a user in the air with a fingertip by image analysis.

CITATION LIST

Patent Document

Patent Document 1: Japanese Patent Application Laid-Open No. 2017-76408

SUMMARY OF THE INVENTION

Problems to be Solved by the Invention

However, in the technique disclosed in Patent Document 1, it is necessary to move the fingertip relatively largely in order to secure the accuracy of gesture recognition, and there is a concern about deterioration of operability.

The present technology has been made in view of the circumstances described above, and has an object to improve the operability of a non-contact manipulation.

Solutions to Problems

A detection processing device according to an aspect of the present technology includes a detection processing unit that inputs shape detection information that is information obtained by capturing a shape of a hand of a user in at least two or more dimensions, and detects a motion of the hand including at least presence or absence of contact between fingertips of the user on the basis of the shape detection information.

For example, bringing the fingertips into contact with each other, such as bringing the fingertips of the thumb and the index finger into contact with each other, can be realized without difficulty for the user and with a small motion of the hand.

Furthermore, an information processing system according to another aspect of the present technology includes a detection processing unit that inputs shape detection information that is information obtained by capturing a shape of a hand of a user in at least two or more dimensions, and detects a motion of the hand including at least presence or absence of contact between fingertips of the user on the basis of the shape detection information; and a response processing execution unit that executes processing according to manipulation input information of the user recognized from information on the motion of the hand detected by the detection processing unit.

Therefore, an information processing system that receives, as a non-contact manipulation, a manipulation that can be realized without difficulty for the user and with a small motion of the hand, and executes processing according to the manipulation is realized.

MODE FOR CARRYING OUT THE INVENTION

Hereinafter, embodiments will be described in the following order.

<1. Outline of information processing system>
<2. Hardware configuration>
(2-1. Configuration of detection processing device)
(2-2. Configuration of information processing device)
<3. Functional configuration>
<4. Regarding detection of motion of hand>
<5. Regarding manipulation response processing>
(5-1. Specific example of manipulation response processing)
(5-2. Example of processing procedure)
<6. Modification example>

<7. Summary of embodiments>
<8. Present technology>
<1. Outline of Information Processing System>

Figure 1:
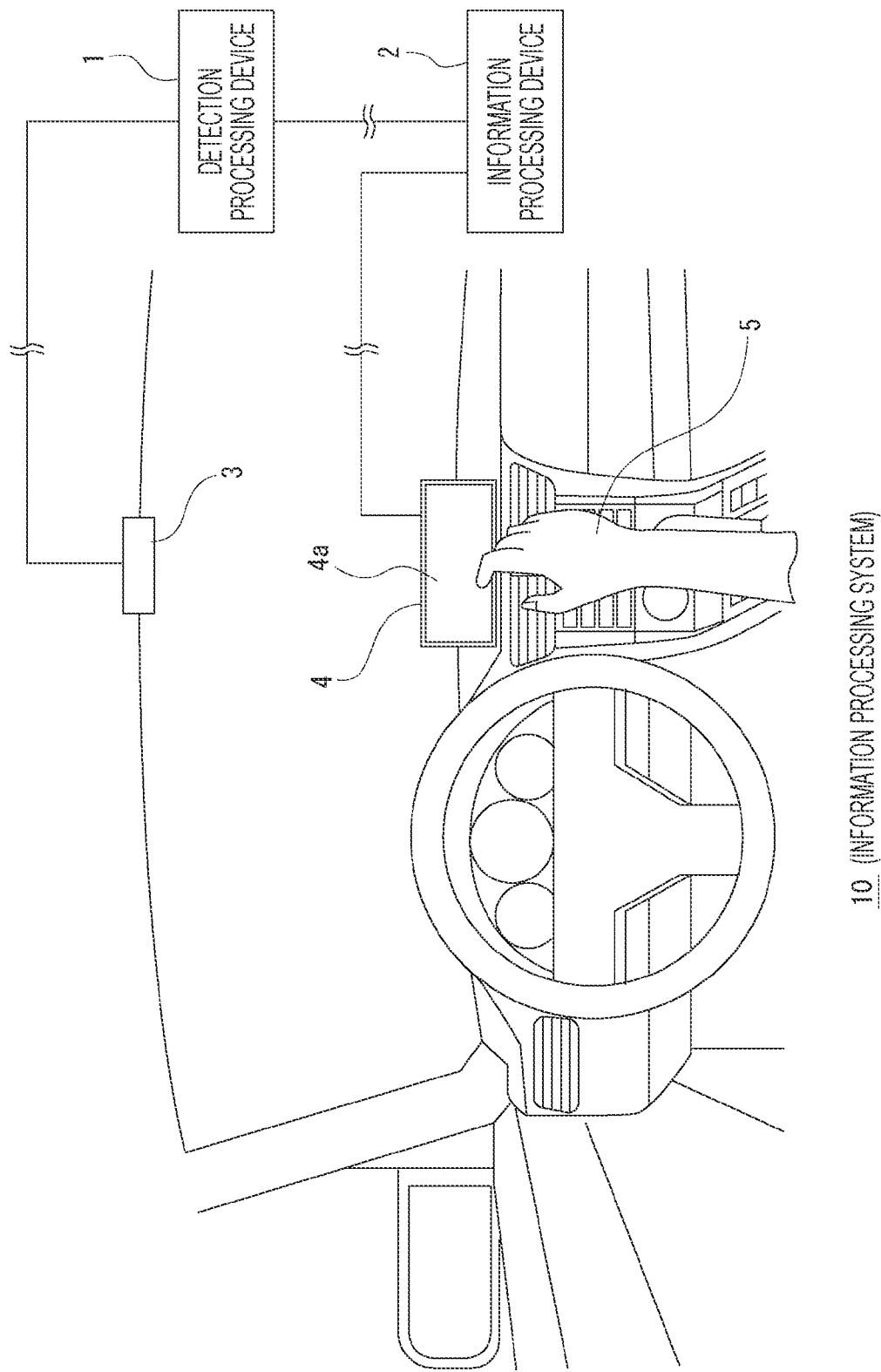
FIG. 1 is a diagram for describing a configuration outline of an information processing system as an embodiment according to the present technology.

FIG. 1 is a diagram for describing a configuration outline of an information processing system 10 as an embodiment according to the present technology.

The information processing system 10 is configured as a system that recognizes manipulation content on the basis of a result of detecting a motion of a user's hand for a non-contact manipulation performed by the user moving the hand in a predetermined mode, and executes processing according to the recognized manipulation content. Here, as an application example of such a system, an application example to a car navigation system will be described.

As illustrated, the information processing system 10 includes at least a detection processing device 1, an information processing device 2, a sensor device 3, and a display device 4. For example, an occupant such as a driver in a vehicle is assumed as the user, and the information processing system 10 detects the motion of a hand 5 of the user, recognizes the manipulation content on the basis of the detection result of the motion of the hand 5, and executes processing according to the recognized manipulation content.

The sensor device 3 is a device for obtaining shape detection information that is information obtained by capturing the shape of the hand 5 in at least two or more dimensions.

In the present example, the sensor device 3 is configured to be able to obtain three-dimensional detection information obtained by three-dimensionally capturing (that is, stereoscopically capturing) the shape of the hand 5 as the shape detection information described above. Specifically, it is configured as a distance measuring device capable of obtaining a distance image. The distance image means information in which a plurality of pixels in the horizontal direction and a plurality of pixels in the vertical direction are set to have a predetermined resolution, and a distance measurement value to a subject is associated with each pixel.

As the distance measuring device for obtaining the distance image, for example, a device that performs distance measurement by a known distance measuring method such as a time of flight (ToF) method, a structured light method, or a stereo method can be used.

In the present example, the sensor device 3 is installed at a ceiling portion between the driver's seat and the passenger's seat in the vehicle interior such that the hand 5 of the user seated on the driver's seat or the passenger's seat can be captured from directly above.

The detection processing device 1 is configured as, for example, a computer device, inputs output information of the sensor device 3, that is, the shape detection information obtained by capturing the shape of the hand 5 of the user, and performs processing for detecting the motion of the hand 5 of the user on the basis of the shape detection information.

The information processing device 2 is configured as, for example, a computer device, and is a device that executes processing related to the car navigation in the present example.

For example, the display device 4 including a display panel such as a liquid crystal display (LCD) panel or an organic electro-luminescence (EL) panel is connected to the information processing device 2. The information processing device 2 performs processing for displaying information related to the car navigation, such as displaying a map or displaying arrow information for guidance, on a display screen 4a of the display device 4, as the processing related to the car navigation.

Furthermore, the information processing device 2 executes processing according to the user's manipulation input information recognized from the information on the motion of the hand 5 detected by the detection processing device 1. In the present example, the manipulation input information expressed by the motion of the hand 5 is manipulation input information related to the car navigation, and the information processing device 2 executes processing related to the car navigation according to the user's manipulation input information recognized from the information on the motion of the hand 5. For example, as in an example described later, processing and the like for scrolling, enlarging, and reducing the map are executed.

Note that although FIG. 1 illustrates an example in which the detection processing device 1 is configured separately from the sensor device 3, the detection processing device 1 and the sensor device 3 can be configured as an integrated device.

Furthermore, the detection processing device 1 and the information processing device 2 can also be configured integrally instead of separately, and moreover, the information processing device 2 and the display device 4 can also be configured integrally instead of separately.

Depending on the arrangement position of the sensor device 3, all of the detection processing device 1, the information processing device 2, the sensor device 3, and the display device 4 may be configured as an integrated device.

<2. Hardware Configuration>
(2-1. Configuration of Detection Processing Device)

Figure 2:
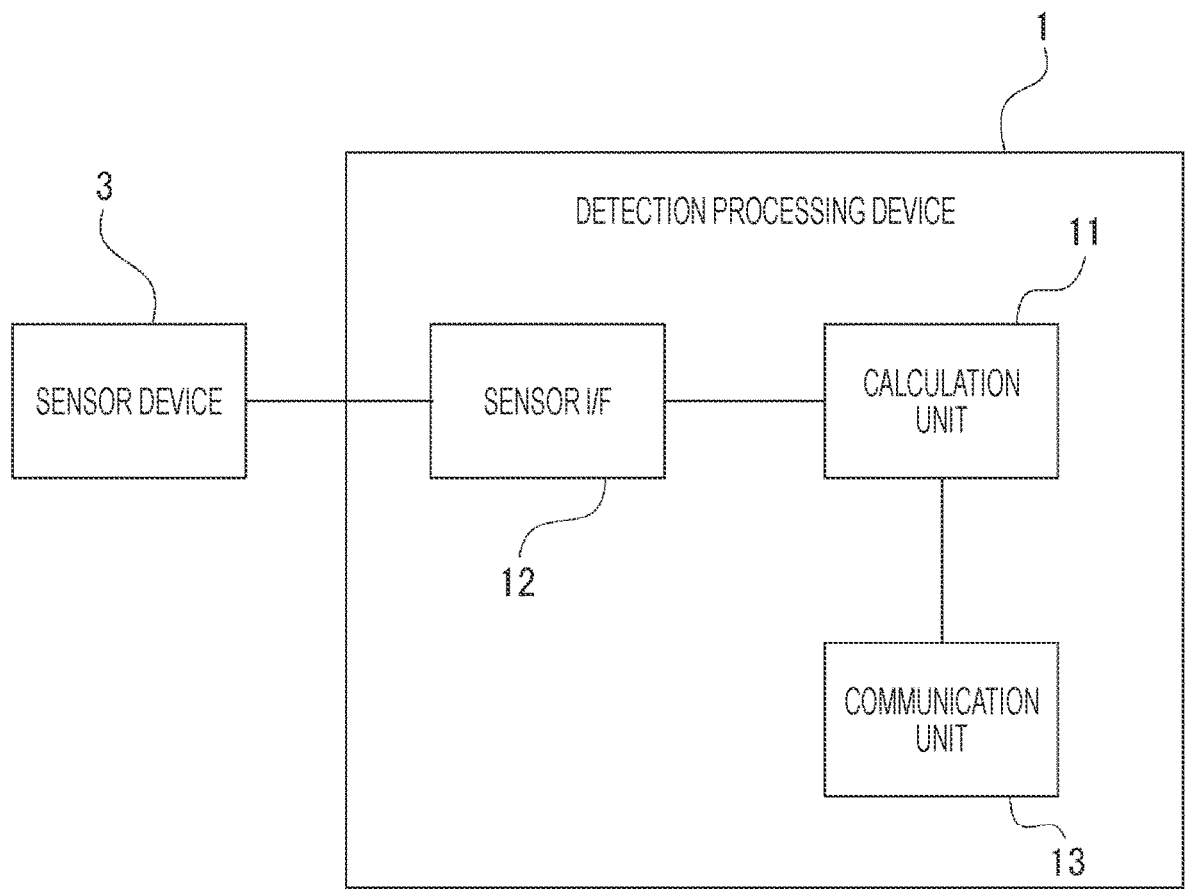
FIG. 2 is a block diagram for describing an internal configuration example of a detection processing device as an embodiment.

FIG. 2 is a block diagram for describing an internal configuration example of the detection processing device 1 in which the sensor device 3 illustrated in FIG. 1 is illustrated together with the internal configuration example of the detection processing device 1.

As illustrated, the detection processing device 1 includes a calculation unit 11, a sensor interface (I/F) 12, and a communication unit 13.

The calculation unit 11 includes, for example, a microcomputer including a central processing unit (CPU), a read only memory (ROM), a random access memory (RAM), and the like, and the CPU executes processing according to a program stored in the ROM described above (program read from the ROM to the RAM), thereby executing programmed predetermined processing.

The sensor I/F 12 and the communication unit 13 are connected to the calculation unit 11.

The sensor I/F 12 is configured as an interface unit that exchanges data with the sensor device 3 according to a predetermined communication scheme.

The calculation unit 11 can input the shape detection information of the hand 5 (in the present example, data of distance image) obtained by the sensor device 3 via the sensor I/F 12.

The communication unit 13 performs communication with an external device by wired or wireless communication, bus communication, and the like. In the present example, the communication unit 13 is used by the calculation unit 11 to exchange various kinds of data with the information processing device 2.

Here, the calculation unit 11 performs detection processing of the motion of the hand 5 of the user based on the shape detection information input from the sensor device 3, and processing for outputting the information on the detected motion of the hand 5 to the information processing device 2, and the details of the processing will be described later again.

(2-2. Configuration of Information Processing Device)

Figure 3:
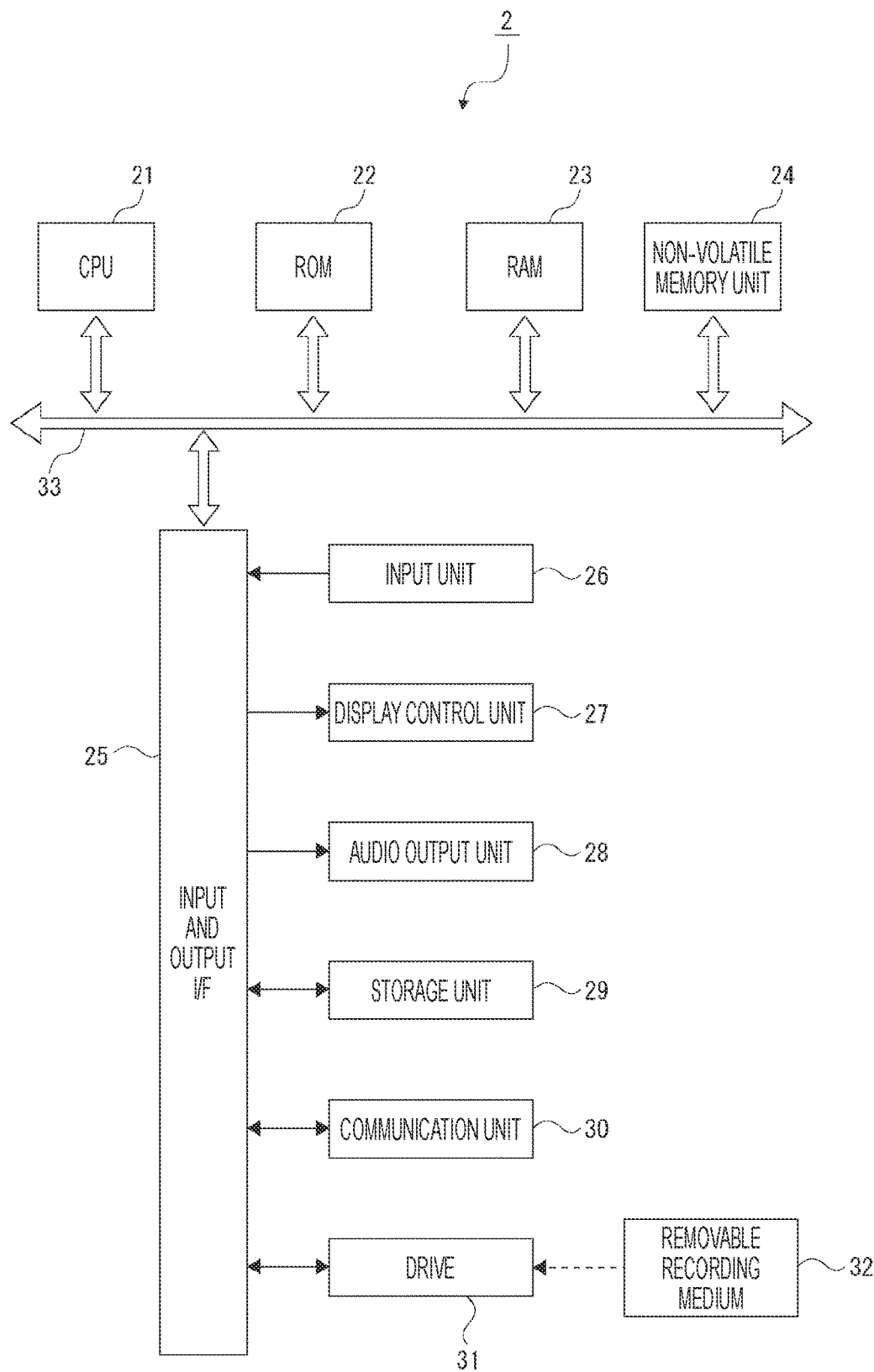
FIG. 3 is a block diagram illustrating an internal configuration example of an information processing device as an embodiment.

FIG. 3 is a block diagram illustrating an internal configuration example of the information processing device 2.

In FIG. 3, a CPU 21 of the information processing device 2 executes various kinds of processing according to a program stored in a ROM 22 or a program loaded from a storage unit 29 to a RAM 23. Furthermore, the RAM 23 also appropriately stores data and the like necessary for the CPU 21 to execute various kinds of processing.

The CPU 21, the ROM 22, and the RAM 23 are connected to one another via a bus 33. Furthermore, an input and output interface 25 is also connected to the bus 33.

An input unit 26 including a manipulation element and a manipulation device is connected to the input and output interface 25.

For example, as the input unit 26, various kinds of manipulation elements and manipulation devices such as a keyboard, a mouse, a key, a dial, a touch panel, a touch pad, a remote controller, and the like are assumed.

The manipulation by the user is detected by the input unit 26, and a signal corresponding to the input manipulation is interpreted by the CPU 21.

Furthermore, a display control unit 27 that performs display control for displaying various kinds of information on the display device 4 described above is connected to the input and output interface 25. The CPU 21 can display various kinds of information on the display screen 4a of the display device 4 by giving an instruction to the display control unit 27.

For example, the CPU 21 can display map information for navigation, various manipulation menus, icons, messages, and the like, that is, image information for realizing a graphical user interface (GUI) on the display screen 4a.

Moreover, an audio output unit 28 including a speaker and the like is connected to the input and output interface 25. Note that the audio output unit 28 may be configured separately from the information processing device 2.

In some cases, the storage unit 29 including a hard disk, a solid-state memory, or the like, and a communication unit 30 including a modem or the like are connected to the input and output interface 25.

For example, the communication unit 30 performs communication with communication processing via a transmission line such as the Internet, wired or wireless communication with various devices, bus communication, or the like.

Furthermore, a drive 31 is also connected to the input and output interface 25 as necessary, and a removable recording medium 32 such as a magnetic disk, an optical disk, a magneto-optical disk, or a semiconductor memory is appropriately mounted.

The drive 31 can read, for example, various kinds of image data or audio data, various kinds of computer programs, and the like from the removable recording medium 32. The read data is stored in the storage unit 29, and for the image data and the audio data, an image and an audio based on the data are output by the display device 4 and the audio output unit 28. Furthermore, the computer program and the like read from the removable recording medium 32 are installed in the storage unit 29, as necessary.

In the information processing device 2, software can be installed via network communication by the communication unit 30 or the removable recording medium 32. Alternatively, the software may be stored in advance in the ROM 22, the storage unit 29, and the like.

<3. Functional Configuration>

The function of each of the detection processing device 1 and the information processing device 2 as the embodiments will be described with reference to FIGS. 4 and 5.

Figure 4:
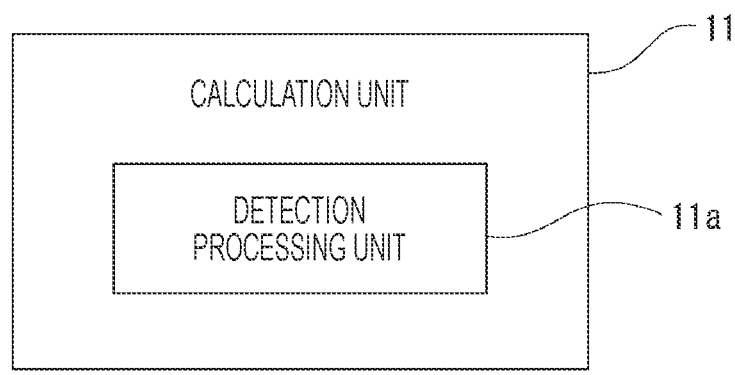
FIG. 4 is a functional block diagram illustrating a function, as an embodiment, of a calculation unit of a detection processing device.

FIG. 4 is a functional block diagram illustrating a function, as an embodiment, of the calculation unit 11 of the detection processing device 1.

As illustrated, the calculation unit 11 has a function as a detection processing unit 11a.

The detection processing unit 11a inputs the shape detection information of the hand 5 obtained by the sensor device 3, and detects the motion of the hand 5 including at least the presence or absence of contact between the fingertips of the user on the basis of the shape detection information.

Note that a specific detection method of the motion of the hand 5 including such presence or absence of contact between the fingertips will be described later again.

Figure 5:
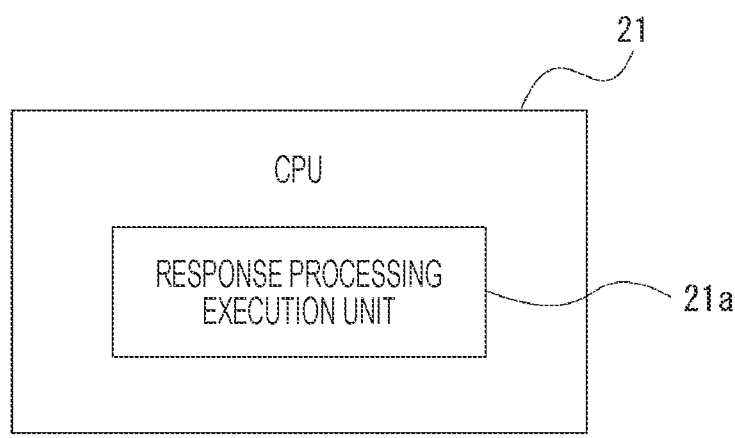
FIG. 5 is a functional block diagram illustrating a function, as an embodiment, of a CPU of an information processing device.

FIG. 5 is a functional block diagram illustrating a function, as an embodiment, of the CPU 21 of the information processing device 2.

As illustrated, the CPU 21 includes a response processing execution unit 21a.

Furthermore, the response processing execution unit 21a executes processing according to the user's manipulation input information recognized from the information on the motion of the hand 5 detected by the detection processing device 1.

Specific examples of the kind of the manipulation input information to be recognized and the processing to be executed will be described below.

<4. Regarding Detection of Motion of Hand>

A specific example of the detection processing of the motion of the hand 5 performed by the calculation unit 11 will be described with reference to the flowchart of FIG. 6.

Here, the following detection information is specifically obtained as the detection information regarding the motion of the hand 5.

Figure 6:
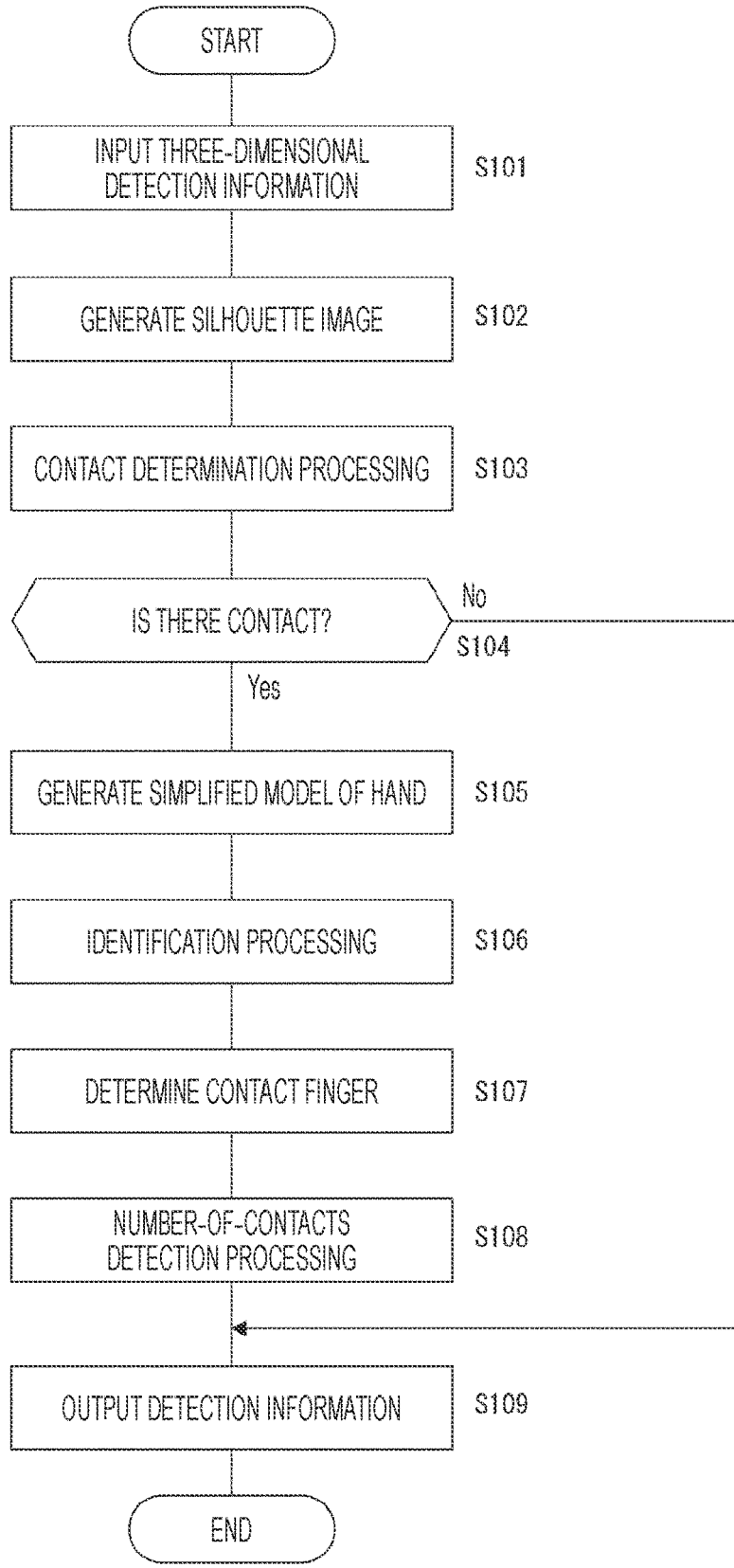
FIG. 6 is a flowchart illustrating an example of detection processing of a motion of a hand in an embodiment.

1) Contact flag: indicating the presence or absence of contact between the fingertips of the thumb and another finger in the present example
2) Number of contacts of fingertips for each set of the thumb and the index finger, the thumb and the middle finger, and the thumb and the ring finger: number of contacts per unit time
3) Palm center position information: position information at predetermined time intervals The processing of FIG. 6 is repeatedly executed at a predetermined cycle, for example. Therefore, for the state of the hand 5 of the user, the detection information at predetermined time intervals can be obtained, and the information indicating the motion of the hand 5 can be output to the information processing device 2.

The execution cycle of the processing illustrated in FIG. 6 affects the resolution in the time direction for the motion detection of the hand 5. In order to be able to cope with quick motion of the hand 5, it is desirable to shorten the execution cycle of the processing illustrated in FIG. 6. In the present example, the execution cycle is a cycle of $1/30$ seconds, for example. Furthermore, the detection cycle of the sensor device 3 (in the present example, the acquisition cycle of the distance image) is also set to $1/30$ seconds.

Note that the execution cycle of the processing of FIG. 6 and the detection cycle of the sensor device 3 can be set to other than $1/30$ seconds, for example, $1/60$ seconds or $1/120$ seconds.

First, in step S101, the calculation unit 11 performs three-dimensional detection information input processing.

That is, the three-dimensional detection information as the distance image obtained by the sensor device 3 is input.

Figure 7:
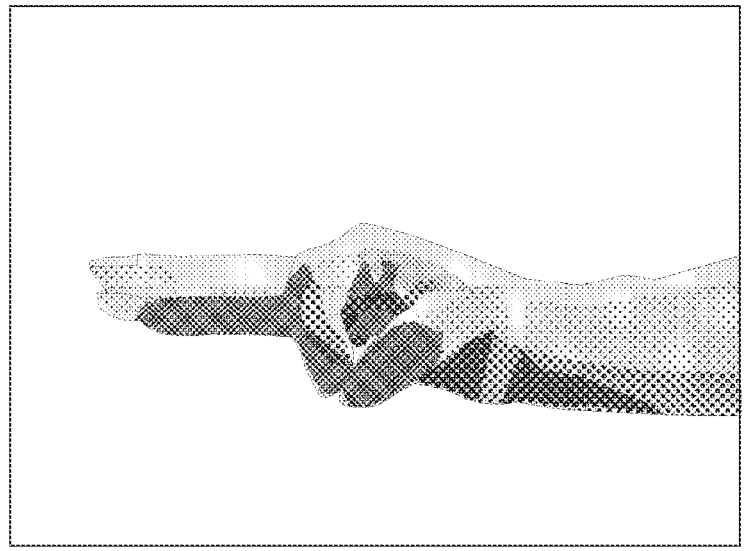
FIG. 7 is a diagram illustrating an image of three-dimensional detection information of a hand.

FIG. 7 illustrates an image of the three-dimensional detection information of the hand 5.

As illustrated, the three-dimensional detection information as the distance image is the point cloud data of the three-dimensional position. The point cloud of the three-dimensional position is a set of three-dimensional coordinate points (x, y, z) obtained in a case where an arbitrary origin is set, and the number of points depends on the resolution (the number of pixels in the horizontal direction and the vertical direction) of the sensor device 3.

In FIG. 6, in step S102 subsequent to step S101, the calculation unit 11 performs silhouette image generation processing. That is, a silhouette image as a two-dimensional image is generated on the basis of the three-dimensional detection information acquired in step S101.

Figure 8:
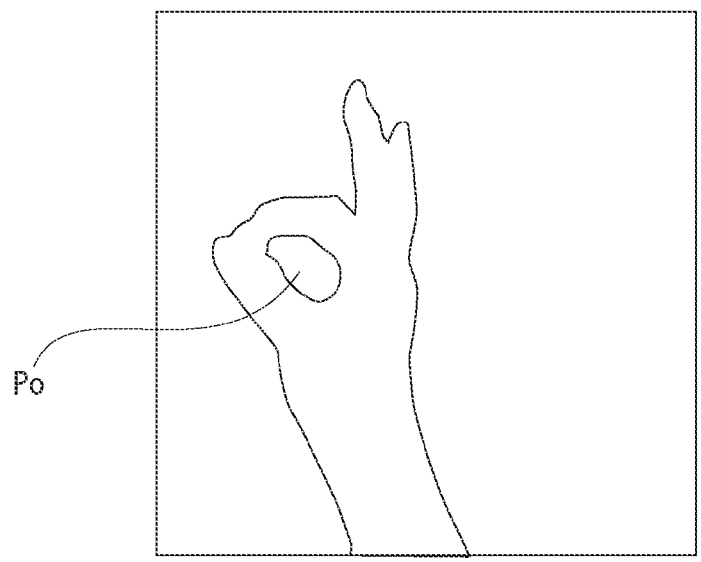
FIG. 8 is an explanatory diagram of a silhouette image.

FIG. 8 is an explanatory diagram of the silhouette image.

The silhouette image means an image obtained by projecting a silhouette of an object in a three-dimensional space on a two-dimensional plane.

In the present example, the silhouette image is generated as an image in which "1" is assigned to the region of the hand 5 and "0" is assigned to the other regions in the distance image as the three-dimensional detection information. Therefore, an image representing the silhouette of the hand 5 as illustrated in FIG. 8 can be obtained.

In FIG. 6, in step S103 subsequent to step S102, the calculation unit 11 performs contact determination processing. That is, the presence or absence of contact between the fingertips of the thumb and the other finger is determined on the basis of the silhouette image described above.

Here, in the silhouette image of FIG. 8, in a case where the fingertips of the thumb and the other finger are in contact with each other, a hollow portion Po as illustrated in the drawing, that is, a portion surrounded by the region of the hand 5 is obtained.

Therefore, by determining the presence or absence of such a hollow portion Po in the silhouette image, it is possible to determine the presence or absence of contact between the fingertips of the thumb and the other finger.

In this case, depending on the roll angle of the wrist and the like, even in a case where the fingertips of the thumb and the other finger are in contact with each other, the hollow portion Po may not be obtained in the silhouette image. Therefore, a plurality of sensor devices 3 is provided, and three-dimensional detection information and the silhouette image in which the hand 5 is captured at a plurality of angles can be obtained. Therefore, the hollow portion Po can be captured in at least any silhouette image among the silhouette images of the plurality of angles, and the determination accuracy of the presence or absence of contact between the fingertips can be improved.

Hereinafter, for the sake of explanation, a case where the hollow portion Po can be captured by only one sensor device 3 installed on the ceiling in the vehicle interior will be considered.

Furthermore, it is considered that a relatively small hollow portion Po that is not caused by the contact between the fingertips of the thumb and the other finger is formed in the silhouette image depending on the state of the hand 5.

Therefore, in the present example, the presence or absence of contact between the fingertips is detected on the basis of the size of the hollow portion Po instead of determining only the presence or absence of the hollow portion Po in the silhouette image.

Specifically, in a case where the presence or absence of the hollow portion Po in the silhouette image is determined and it is determined that there is a hollow portion Po, the calculation unit 11 obtains the size (area) of all the detected hollow portions Po, and in a case where there is a hollow portion Po with a size equal to or greater than a predetermined threshold or more, the calculation unit 11 obtains a determination result that there is a contact between the fingertips of the thumb and the other finger.

On the other hand, in a case where there is no hollow portion Po with a size equal to or greater than the threshold described above in the silhouette image, a determination result that there is no contact between the fingertips of the thumb and the other finger is obtained.

In step S103, in a case where it is determined that there is a contact between the fingertips of the thumb and the other finger as a result of performing the determination processing based on the hollow portion Po as described above, the calculation unit 11 generates flag information stored with a value indicating ON (for example, "1") as the contact flag, and in a case where it is determined that there is no contact between the fingertips of the thumb and the other finger, the calculation unit 11 generates flag information stored with a value indicating OFF (for example, "0") as the contact flag.

In step S104 subsequent to step S103, the calculation unit 11 performs determination processing of the presence or absence of contact, that is, determination of the presence or absence of contact between the fingertips of the thumb and the other finger based on the contact flag described above.

In a case where the contact flag is OFF and it is determined that there is no contact between the fingertips of the thumb and the other finger, the calculation unit 11 advances the processing to step S109 as described later.

On the other hand, in a case where the contact flag is ON and it is determined that there is a contact between the fingertips of the thumb and the other finger, the calculation unit 11 advances the processing to step S105.

The processing from steps S105 to S108 is processing for detecting which finger is combined with the thumb to actually make the contact between the fingertips, detecting the position of the palm, and detecting the number of contacts per unit time.

Specifically, first, in step S105, the calculation unit 11 performs generation processing of a simplified model of the hand 5 based on the input three-dimensional detection information, as the generation processing of a simplified model of the hand.

Figure 9:
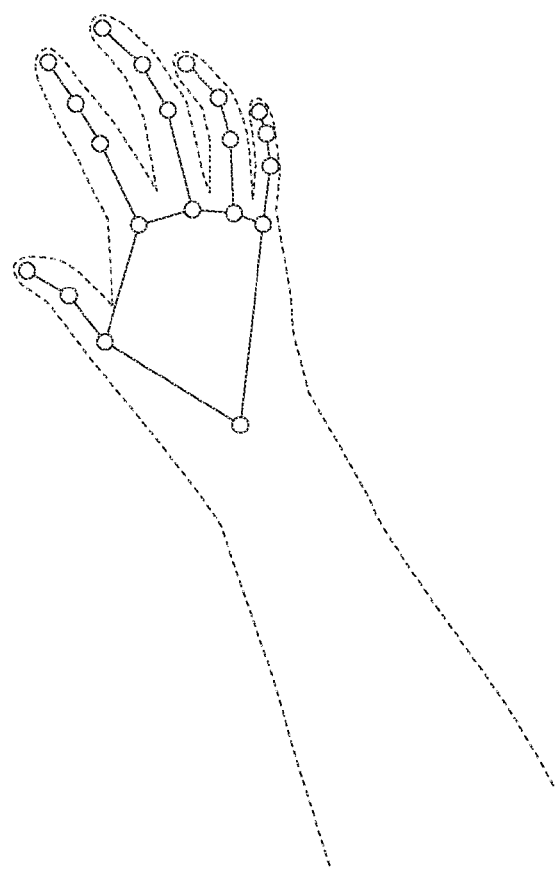
FIG. 9 is an explanatory diagram of a simplified model of a hand.

FIG. 9 is an explanatory diagram of a simplified model of the hand 5.

The simplified model of the hand 5 here means a model in which the configuration of the hand is simply represented by a plurality of predetermined parts such as a fingertip part and various joint parts among the parts constituting the hand 5 and lines connecting the parts.

Generating such a simplified model of the hand 5 can be rephrased as estimating the position of each predetermined part such as the fingertip part and various joint parts constituting the hand 5.

Note that, since there are many methods for generating the simplified model of the hand 5, a known general-purpose method is only required to be used. For example, there is a method of estimating the position of each part of the hand by a machine learned artificial intelligence (AI) model after reducing the information amount by using a set of point clouds for each region in the three-dimensional detection information as one unit. Therefore, it is possible to obtain the three-dimensional position of each part of the hand 5 including each fingertip.

Note that in order to improve the model generation accuracy in generating the simplified model of the hand 5, it is effective to provide a plurality of sensor devices 3 and obtain three-dimensional detection information in which the hand 5 is captured at a plurality of angles.

In FIG. 6, in step S106 subsequent to step S105, the calculation unit 11 performs processing of identifying each part of the hand 5 from the simplified model of the hand 5 as identification processing. In the present example, in this identification processing, the fingertips of the thumb, the index finger, the middle finger, and the ring finger and the palm of the hand 5 are identified.

Here, the position of the center of the palm is detected as the position of the palm.

In step S107 subsequent to step S106, the calculation unit 11 performs determination processing of a contact finger.

Specifically, in the present example, the calculation unit 11 determines a finger having the shortest separation distance between the fingertips with respect to the thumb as a contact finger (a finger of which the fingertip is in contact with the fingertip of the thumb).

Since the contact of the tip of any finger with the tip of the thumb has already been recognized in step S104 described above, the contact finger can be specified by determining the finger having the shortest separation distance between the fingertips with respect to the thumb as described above.

Note that, since there is a concern that the contact between the tip of the thumb and the tip of the little finger becomes a manipulation of applying a load to the hand 5, the little finger is excluded from the determination candidates of the contact finger in the present example, but this does not deny the inclusion of the little finger as the determination candidate of the contact finger.

In step S108 subsequent to step S107, the calculation unit 11 executes number-of-contacts detection processing. This processing is processing for detecting the number of contacts with the thumb per unit time (the number of contacts between the fingertips) for each finger (in the present example, the index finger, the middle finger, and the ring finger) as the contact target with the thumb. Here, from the viewpoint of operability, the number of contacts up to three is detected for each of the index finger, the middle finger, and the ring finger.

The number-of-contacts detection processing of step S108 is performed, for example, in the following manner.

First, in a case where the start of the contact between the fingertips of the thumb and the contact target finger (in the present example, the index finger, the middle finger, and the ring finger) is recognized at a certain processing time, the value of the number of contacts for the contact target finger is set to "1". Then, at the subsequent processing time, in a case where the start of the contact between the thumb and the contact target finger is recognized again within an arbitrary time interval t seconds, the value of the number of contacts of the contact target finger is set to "2". On the other hand, in a case where the start of the contact is not recognized again within t seconds, the value of the number of contacts of the contact target finger is confirmed to be "1".

Furthermore, after the processing time after the number of contacts becomes "2", in a case where the start of the contact between the thumb and the contact target finger is recognized again within t seconds, the value of the number of contacts of the contact target finger is set to "3". On the other hand, in a case where the start of the contact is not recognized again within t seconds, the value of the number of contacts of the contact target finger is confirmed to be "2".

Note that the contact time interval t is assumed to be, for example, about 0.2 seconds.

In step S109 subsequent to step S108, the calculation unit 11 performs processing for outputting the detection information obtained in the detection processing described above to the information processing device 2 via the communication unit 13, as the output processing of the detection information.

Specifically, in this output processing, in a case where the processing transitions from step S108, that is, in a case where the contact flag based on the silhouette image is ON, processing of outputting the information on the contact flag, the information on the contact finger determined in step S107, the information on the number of contacts for each of the index finger, the middle finger, and the ring finger detected in step S108 (any of 0 to 3, respectively), and the information on the position of the palm obtained in the identification processing of step S106 to the information processing device 2 is performed.

On the other hand, in a case where the processing transitions from step S104, that is, in a case where the contact flag based on the silhouette image is OFF, the calculation unit 11 performs processing of outputting the information on the contact flag to the information processing device 2, as the output processing of step S109.

The calculation unit 11 ends a series of processing illustrated in FIG. 6 in response to the execution of the processing of step S109.

Note that, according to the processing described above, the calculation unit 11 detects the position of the palm at a predetermined cycle, which can be said to correspond to detecting the motion of the palm.

<5. Regarding Manipulation Response Processing>

(5-1. Specific Example of Manipulation Response Processing)

Next, an example of the response processing on the information processing device 2 side according to the detection information by the detection processing device 1 obtained in the processing described above will be described. Specifically, the processing is response processing according to the information on the contact flag or the contact finger, the information on the number of contacts, and the information on the position of the palm described above.

In the following example, it is assumed that the information processing device 2 recognizes a scrolling manipulation, an enlargement or reduction manipulation of a map on the basis of these pieces of detection information, and controls a display mode of the map according to the recognized manipulation.

In the present example, the scrolling manipulation of the map is assumed to be a manipulation of moving the hand 5 in an arbitrary direction parallel to the horizontal plane in a state where the fingertips of the thumb and the index finger are in contact with each other. This can be rephrased as a manipulation of picking and pulling the map in a pseudo manner with the thumb and the index finger.

Figure 10:
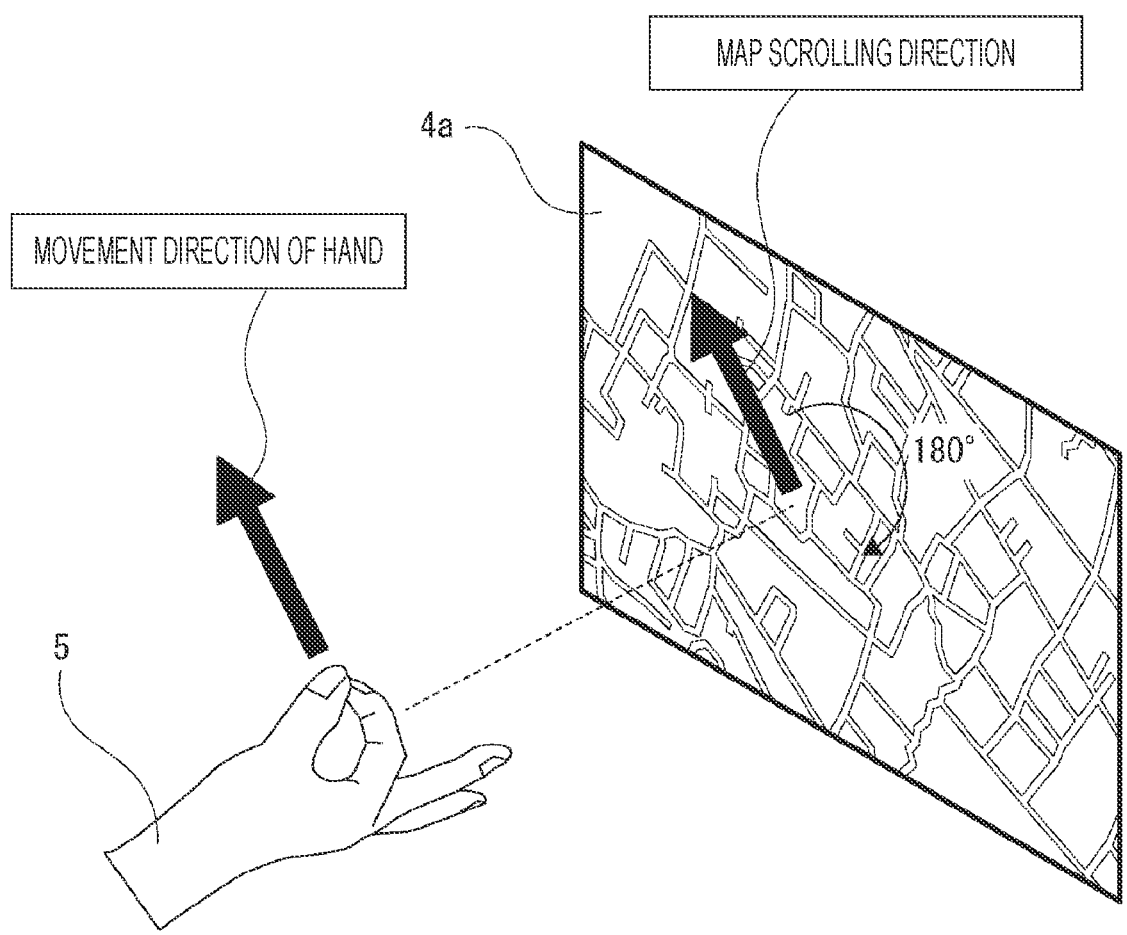
FIG. 10 is a diagram illustrating a relationship between a map scrolling manipulation and a map scrolling operation in an embodiment.

FIG. 10 illustrates a relationship between such a map scrolling manipulation and a map scrolling operation according to the manipulation.

As illustrated, in a case where the manipulation of moving the hand 5 in the left direction is performed in a state where the fingertips of the thumb and the index finger are in contact with each other, the map is similarly scrolled in the left direction on the display screen 4*a*. A scrolling direction of the map here means a direction in which the map is moved with respect to the image frame of the display screen 4*a*, and scrolling the map in the left direction means moving the map in the left direction with respect to the image frame of the display screen 4*a*. In other words, a portion which was invisible on the right side of the image frame of the display screen 4*a* appears to move into the image frame.

In this case, the amount of map scrolling is an amount corresponding to the movement amount of the hand 5 in a state where the fingertips of the thumb and the index finger are in contact with each other.

In this way, the scrolling display of the map is performed according to the scrolling direction and the scrolling amount respectively according to a movement direction and a movement amount of the hand 5 on the horizontal plane in a state where the fingertips of the thumb and the index finger are in contact with each other.

Therefore, the user can scroll the map in an arbitrary direction by an arbitrary amount by repeating a manipulation of picking the map with the thumb and the index finger and moving the hand 5.

Here, in the present example, for the map scrolling, in a case where an initial speed v of the hand 5 after the fingertips of the thumb and the index finger are brought into contact with each other exceeds a predetermined threshold THv, automatic scrolling is executed. The automatic scrolling here means a scrolling method in which scrolling of the map continues for a predetermined time even after the user stops the motion of the hand 5. Specifically, in the automatic scrolling of the present example, after the scrolling is started at a high scroll speed, the scroll speed is gradually attenuated (like inertia), and the scrolling is stopped after a predetermined time from the start of the scrolling.

Therefore, in a case where the user wants to scroll the map largely, it possible to reduce the amount of necessary scrolling manipulation (that is, manipulation of moving the hand 5 in a state where the fingertips of the thumb and the index finger are in contact with each other).

Next, a manipulation of enlarging or reducing the map will be described.

In the present example, the manipulation of enlarging or reducing the map is a manipulation of moving the hand 5 in a direction parallel to the vertical plane (that is, one of the upward and downward directions) in a state where the fingertip of the middle finger instead of the index finger is in contact with the fingertip of the thumb.

Figure 11:
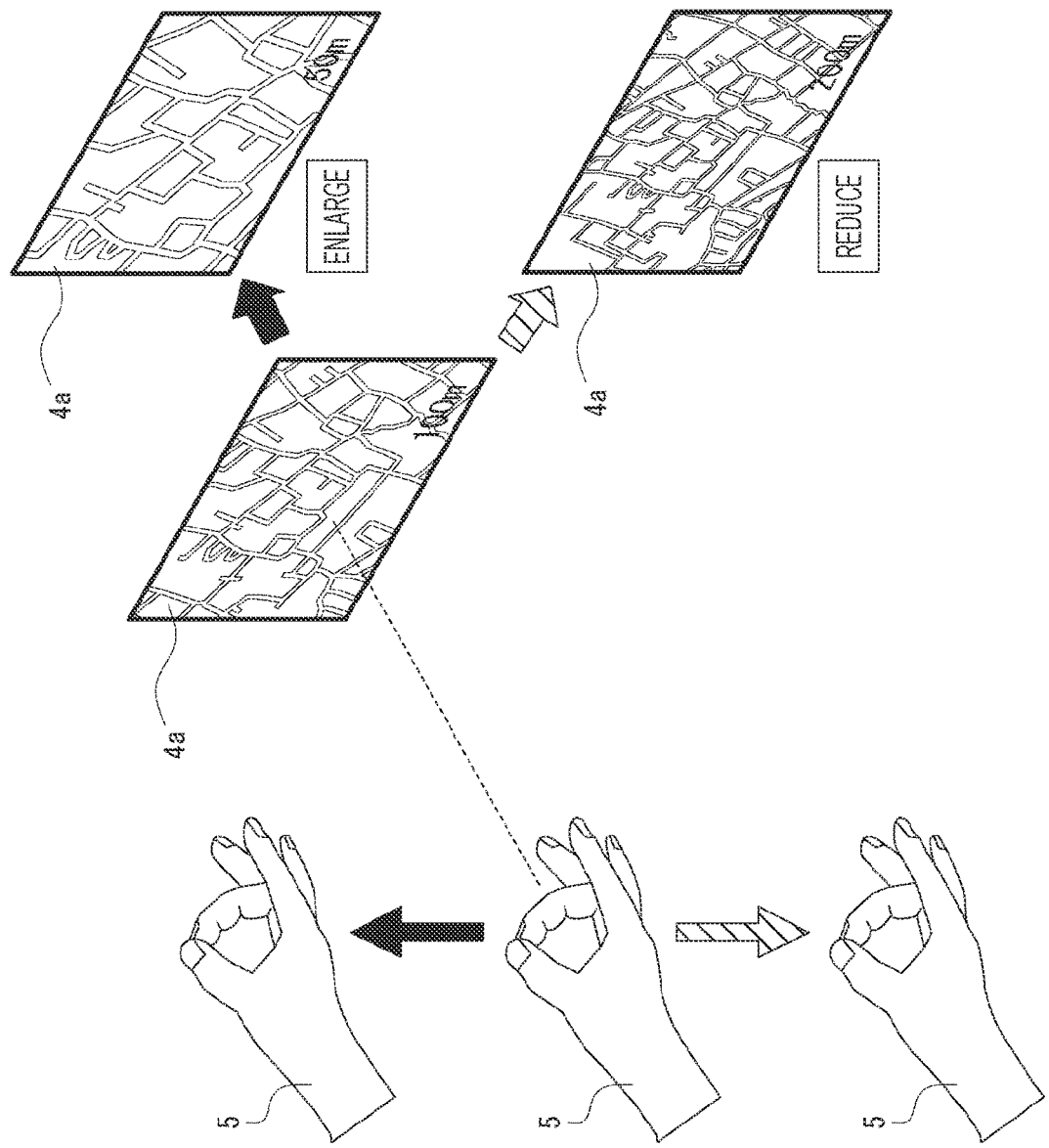
FIG. 11 is a diagram illustrating a relationship between a manipulation of enlarging or reducing a map and an operation of enlarging or reducing the map in an embodiment.

FIG. 11 is a diagram illustrating a relationship between such a manipulation of enlarging or reducing a map and an operation of enlarging or reducing the map according to the manipulation.

As illustrated, for example, a manipulation of moving the hand 5 in the upward direction in a state where the fingertips of the thumb and the middle finger are in contact with each other is a manipulation of enlarging the map. This manipulation can be regarded as a manipulation of picking the map with the thumb and the middle finger and pulling the map in the upward direction. Therefore, the map is enlarged and displayed.

Conversely, a manipulation of moving the hand 5 in the downward direction in a state where the fingertips of the thumb and the middle finger are in contact with each other is a manipulation of reducing the map. Since this manipulation can be regarded as a manipulation of picking the map with the thumb and the middle finger and pulling the map in the downward direction, the map is reduced and displayed.

in the present example, the enlargement and reduction ratios of the map are continuously changed according to the movement amount of the hand 5. That is, in a case where the hand 5 is gradually moved in the upward direction in a state where the fingertips of the thumb and the middle finger are in contact with each other, the enlargement ratio of the map is gradually increased according to the movement amount. Conversely, in a case where the hand 5 is gradually moved in the downward direction in a state where the fingertips of the thumb and the middle finger are in contact with each other, the reduction ratio of the map is gradually increased according to the movement amount.

(5-2. Example of Processing Procedure)

An example of a specific processing procedure for realizing the manipulation response processing as the embodiment described above will be described with reference to a flowchart of FIG. 12.

Figure 12:
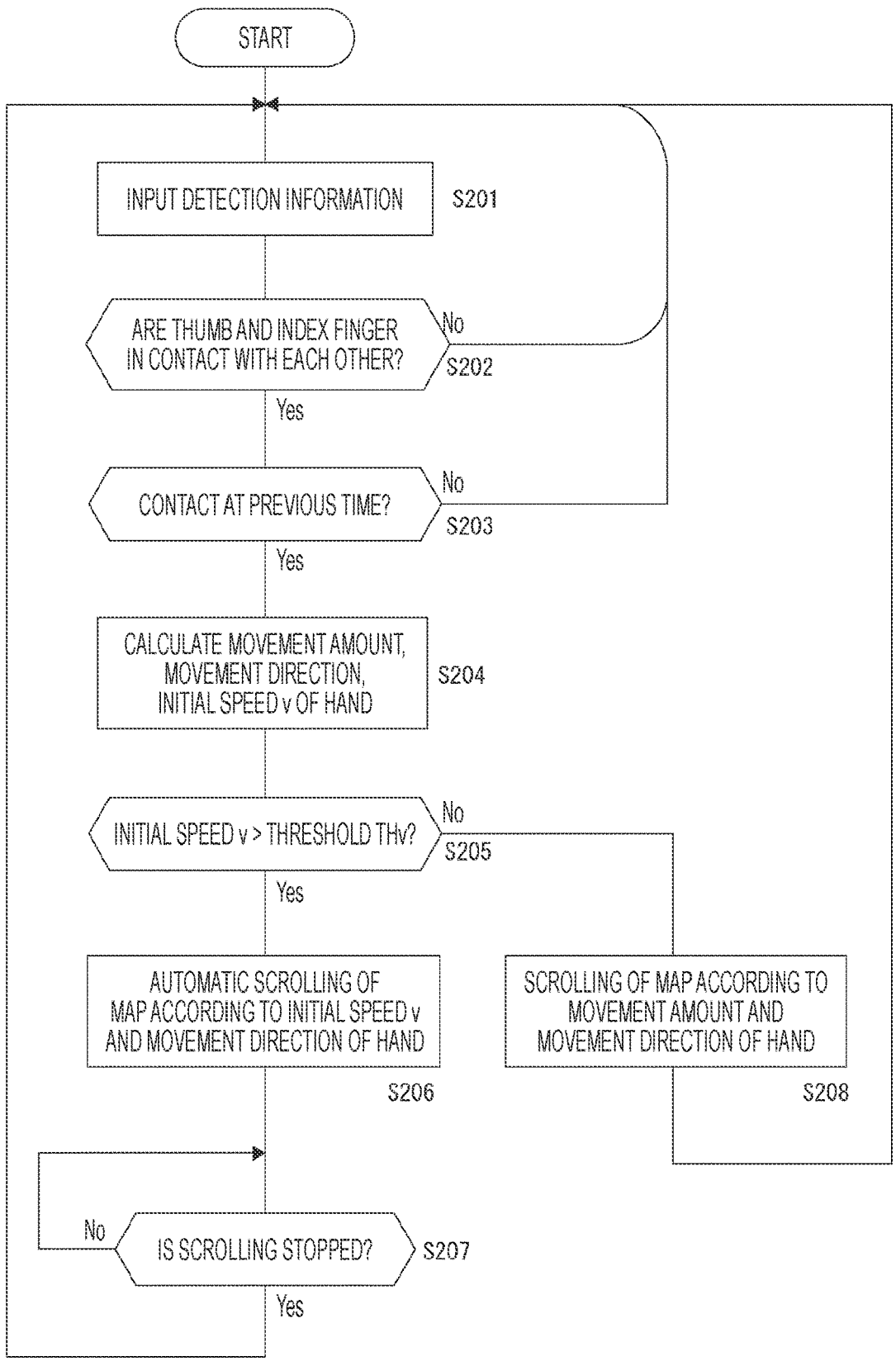
FIG. 12 is a flowchart of manipulation recognition for map scrolling and response processing according to the recognized manipulation.

FIG. 12 is a flowchart of manipulation recognition for the map scrolling and the response processing according to the recognized manipulation.

First, in step S201, the CPU 21 performs processing of inputting detection information. That is, the detection information output by the calculation unit 11 of the detection processing device 1, specifically, in the present example, the information on the contact flag and the contact finger, the information on the number of contacts, and the information on the position of the palm are input (as described above, only the contact flag is output in a case where the contact between the fingertips is not detected).

In step S202 subsequent to step S201, the CPU 21 determines whether or not the thumb and the index finger are in contact with each other. That is, it is determined whether or not the fingertips of the thumb and the index finger are in contact with each other on the basis of the contact flag and the information on the contact finger which are included in the input detection information. In a case where the contact between the fingertips is not detected by the detection processing device 1, only the contact flag is input, but since the contact flag is OFF, it can be determined that the fingertips of the thumb and the index finger are not in contact with each other. On the other hand, in a case where the contact between the fingertips is detected by the detection processing device 1, the contact flag (ON) and the information on the contact finger are input, but in this case, it is determined whether or not the fingertips of the thumb and the index finger are in contact with each other on the basis of the information on the contact finger.

In a case where it is determined in step S202 that the thumb and the index finger are not in contact with each other, the CPU 21 returns to step S201. Therefore, new detection information by the detection processing device 1 is input.

On the other hand, in a case where it is determined in step S202 that the thumb and the index finger are in contact with each other, the CPU 21 proceeds to step S203, and determines whether or not there was a contact at the previous time as well, that is, whether or not the determination result that the thumb and index finger were in contact with each other was obtained in the processing of step S202 executed at the previous processing time.

In step S203, in a case where the condition that there was a contact at the previous time as well is not satisfied, the CPU 21 returns to step S201.

That is, a loop of waiting until the determination result that the thumb and the index finger are in contact with each other is continuously obtained twice is formed by steps S201, S202, and S203.

In a case where it is determined in step S203 that there was a contact at the previous time, the CPU 21 proceeds to step S204, and calculates the movement amount, the movement direction, and the initial speed v of the hand 5. Here, the movement amount, the movement direction, and the initial speed v of the hand 5 can be calculated on the basis of the information on the position of the palm included in the detection information.

In step S205 subsequent to step S204, the CPU 21 determines whether or not the initial speed v is greater than the threshold THv.

In a case where the initial speed v is greater than the threshold THv, the CPU 21 proceeds to step S206, and performs processing of automatically scrolling the map according to the initial speed v and the movement direction of the hand 5.

As the processing of the automatic scrolling in this case, as the map scrolling in a direction corresponding to the movement direction of the hand 5 calculated in step S204, processing of starting the scrolling at a scroll speed by a predetermined speed, then gradually attenuating the scroll speed, and stopping the scrolling after a predetermined time from the start of scrolling is performed.

The CPU 21 waits until the scrolling of the automatic scrolling is stopped in step S207 subsequent to step S206, and returns to step S201 in a case where the scrolling is stopped. Therefore, it possible to cope with a case where a new map scrolling manipulation is performed.

On the other hand, in a case where it is determined in step S205 that the initial speed v is not greater than the threshold THv, the CPU 21 proceeds to step S208, and performs processing of scrolling the map according to the movement amount and the movement direction of the hand 5. That is, processing of scrolling the map by the scrolling amount corresponding to the movement amount of the hand 5 in the scrolling direction corresponding to the movement direction of the hand 5 is performed.

In response to the execution of the processing of step S208, the CPU 21 returns to step S201. Therefore, for the scrolling manipulation in which the initial speed v is equal to or less than the threshold THv, while the scrolling manipulation (that is, the movement of the hand 5 in a state where the fingertips of the thumb and the index finger are in contact with each other) is continued, the processing of step S208 is repeatedly executed, and the map is scrolled in conjunction with the motion of the hand 5.

Here, although description by illustration is omitted, the processing related to enlargement or reduction of a map can be realized by processing similar to that in FIG. 12. However, in this case, the CPU 21 performs processing of determining whether or not the fingertips of the thumb and the middle finger are in contact with each other (using the contact flag and the information on the contact finger) instead of the processing of step S202.

Then, in a case where the fingertips of the thumb and the middle finger are in contact with each other, processing of determining whether or not the fingertips of the thumb and the middle finger are in contact with each other is performed as the processing of step S203. In a case where there was a contact at the previous time, the CPU 21 executes the following processing instead of the processing of step S205 and steps subsequent to step S205. That is, the movement amount and the movement direction of the hand 5 are calculated, and the map is enlarged or reduced according to the calculated movement amount and movement direction. Specifically, in the present example, in a case where the movement direction of the hand 5 is the upward direction, processing of enlarging the map at an enlargement ratio corresponding to the calculated movement amount is performed, and in a case where the movement direction of the hand 5 is the downward direction, processing of reducing the map at a reduction ratio corresponding to the calculated movement amount is performed.

Then, in response to the execution of such enlargement or reduction processing, the CPU 21 returns to step S201.

Note that the following manipulation that does not accompany the movement of the hand 5 can be assigned to the manipulation of enlarging or reducing the map.

That is, two contacts between the fingertips of the thumb and the index finger are set as the map enlargement manipulation for one step, and two contacts between the fingertips of the thumb and the middle finger are set as the map reduction manipulation for one step.

Here, in order for the user to smoothly perform a non-contact manipulation by the motion of the hand 5, it is important to perform feedback for notifying the user that the manipulation has been accepted. As an example of this feedback, for example, feedback using an image can be exemplified.

Figure 13:
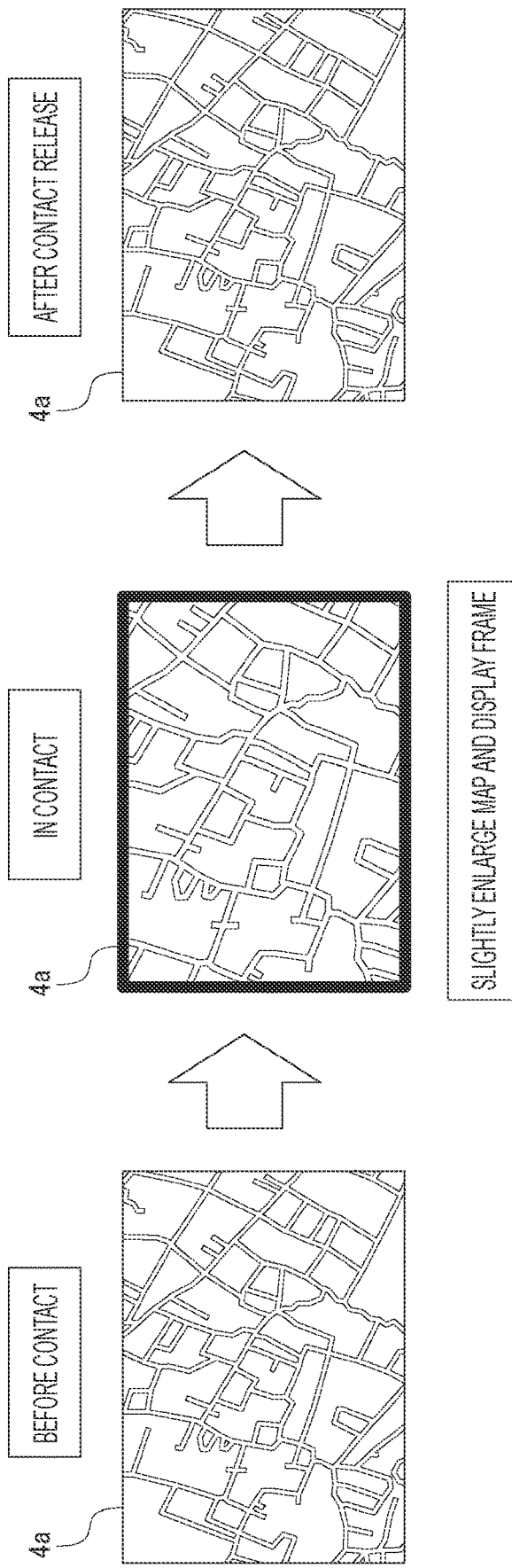
FIG. 13 is a diagram illustrating an example of feedback by images.

FIG. 13 illustrates an example of feedback by images.

For the scrolling and the enlargement or reduction manipulation such as picking up the map exemplified in FIGS. 10 and 11, specifically, the manipulation by the motion of the hand 5 accompanied by the contact between the fingertips of the thumb and the other finger, in a case where the contact between the fingertips of the thumb and the other finger is recognized (that is, in a case where a state where the scrolling manipulation, or the enlargement or reduction manipulation is being received is recognized) as illustrated in FIG. 13, on the display screen 4*a*, it is conceivable to draw a thick frame around the map, or to enlarge the map slightly while the fingers are in contact with each other to remind the user of the manipulation of pulling the map. In this case, in a case where it is recognized that the contact between the fingertips of the thumb and the other finger has been released, the thick frame is hidden as illustrated, and the map reduced scale is returned to the original scale.

Note that the feedback is not limited to visual feedback using an image, and auditory feedback using sound can also be performed.

Regarding the feedback using sound, it is conceivable to output different sounds at the moment when the fingertips are brought into contact with each other and at the moment when the fingertips are separated from each other.

Furthermore, regarding the feedback, it is also conceivable to perform different types of feedback depending on the type of manipulation. For example, in the present example, since there are a total of nine types of contact between the fingertips obtained by three types of the index finger, the middle finger, and the ring finger with respect to the thumb and three types of the number of contacts with each pair of fingers, it is conceivable to perform different types of feedback for these nine types.

Note that the manipulation by the motion of the hand 5 accompanied by the contact between the fingertips is not limited to the map scrolling or the enlargement or reduction manipulation of the map as exemplified above.

For example, it is conceivable to assign to the manipulation determination or the cancellation manipulation. As a specific example, for example, it is conceivable to enable setting of a destination and a subsequent determination manipulation in a car navigation system by using three contacts between the fingertips of the thumb and the index finger as a trigger. Alternatively, three contacts between the fingertips of the thumb and the middle finger may be used as a trigger to enable a cancellation manipulation of various selected items in the car navigation system.

Furthermore, in a case where a certain direction manipulation (menu selection or the like) is required in the process of the determination or cancellation manipulation, it is also conceivable to apply the manipulation in the map scrolling described above to the direction manipulation.

<6. Modification Example>

Here, the embodiment is not limited to the specific example described above, and configurations as various modification examples can be adopted.

For example, in the above description, for the scrolling manipulation of the map, an example has been described in which a manipulation feeling of picking the map and pulling the map in an arbitrary direction is realized, but it is also conceivable that the contact between the fingertips is not treated as an action of picking the map but is treated simply as an action of identifying that the manipulation is the map scrolling. In this case, it is conceivable that the movement of the hand 5 in a state where the fingertips are in contact with each other is treated as an action of instructing a direction in which the user wants to view the map, instead of an action of instructing a direction in which the map is moved. In other words, it is treated as an action of instructing the movement direction of the image frame on the map, instead of the movement direction of the map in the image frame. Specifically, in this case, the map is moved in a direction (a direction different by 180 degrees) opposite to the movement direction of the hand 5, such as moving the map in the left direction in a case where the hand 5 is moved in the right direction.

In this case, in a case where the movement amount from the position (base point) of the hand at the time of the start of the contact between the fingertips is equal to or greater than an arbitrary distance R, the map scrolling is started. The distance R from the base point defines a dead zone region of the map scrolling. By adjusting the distance R, it is possible to control the promptness of the manipulation in each direction.

Figure 14:
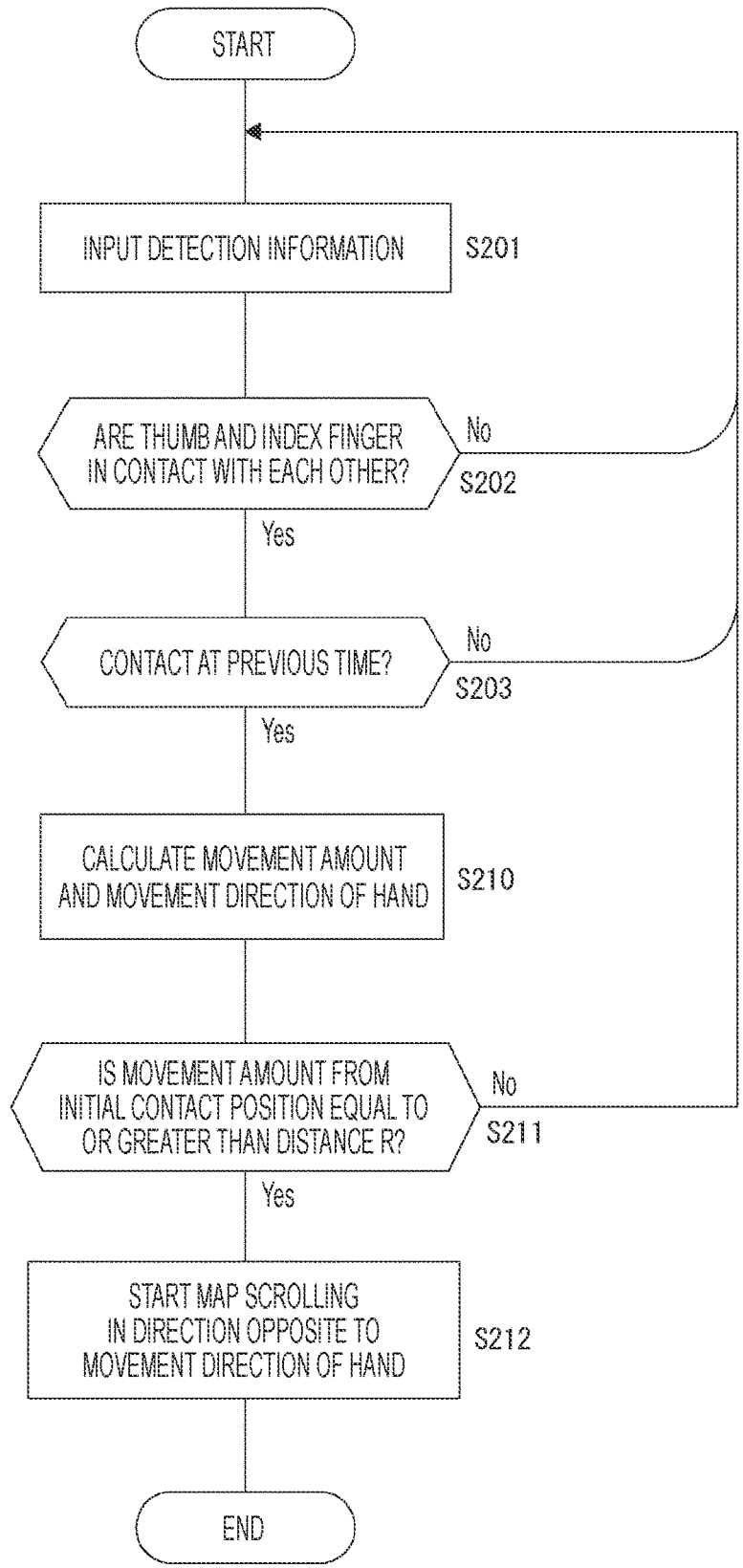
FIG. 14 is a flowchart illustrating a processing procedure example for realizing map scrolling as a modification example.

The flowchart of FIG. 14 illustrates a processing procedure example of the CPU 21 for realizing the map scrolling as such a modification example.

Note that in FIG. 14, the same step numbers will be used for the processing similar to the processing that has already been described in FIG. 12, and the description thereof is omitted.

As illustrated, in this case, in a case where it is determined in step S203 that there was a contact at the previous time, the CPU 21 executes processing of calculating the movement amount and the movement direction of the hand 5 in step S210.

Then, in subsequent step S211, the CPU 21 determines whether or not the movement amount from the initial contact position is equal to or greater than the distance R. That is, it is determined whether or not the movement amount from the base point described above is equal to or greater than the distance R.

In a case where the movement amount from the initial contact position is not equal to or greater than the distance R, the CPU 21 returns to step S201. Therefore, the map scrolling is not executed unless the movement amount from the base point is equal to or greater than the distance R. That is, the dead zone region of the map scrolling described above is realized.

On the other hand, in a case where the movement amount from the initial contact position is equal to or greater than the distance R, the CPU 21 proceeds to step S212, and starts the map scrolling in a direction opposite to the movement direction of the hand 5.

Note that the speed of the map scrolling here is set to a constant speed, and the map scrolling is stopped, for example, in a case where the position of the hand 5 returns to be in a range of the radius R from the initial contact position.

In this case, in a case where the condition that the position of the hand 5 is out of the range of the radius R from the initial contact position is satisfied after the map scrolling is started, it is conceivable to change the scrolling direction according to the change in the direction of the hand 5 viewed from the initial contact position.

Here, also in a case where the map scrolling is performed as a modification example in which the distance R is defined as described above, it is conceivable to perform feedback indicating that the manipulation has been accepted.

Figure 15:
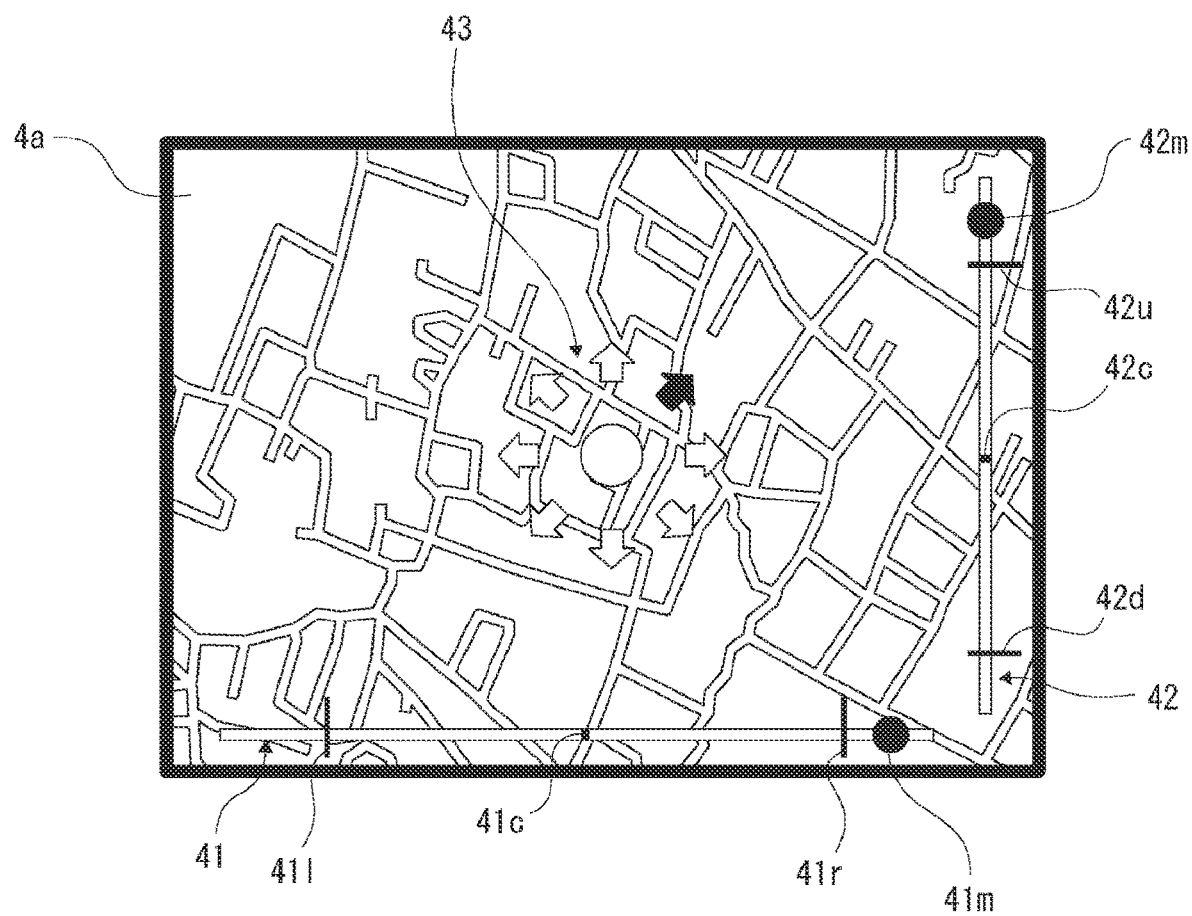
FIG. 15 is a diagram for describing an example of feedback corresponding to a case of the modification example.

FIG. 15 is a diagram for describing an example of feedback corresponding to a case of the modification example.

Note that, here, as an example, the direction of the map scrolling is limited to eight directions (upward and downward, left and right, and oblique), but the scrolling direction is not limited thereto.

In the drawing, a display element other than the map on the display screen 4a is used as a display element for feedback. Specifically, the display element for feedback in this case includes at least a horizontal direction gauge 41; a scroll start point 41l, a scroll start point 41r, a center point 41c, and a current point marker 41m that are displayed on the horizontal direction gauge 41; a vertical direction gauge 42; scroll start points 42u and 42d, a center point 42c, and a current point marker 42m that are displayed on the vertical direction gauge 42; and a scroll direction display unit 43.

The display element for such feedback starts to be displayed in a case where the manipulation mode of the map scrolling is set, specifically, in the present example, in a case where contact between fingertips by a predetermined combination such as the fingertips of the thumb and the index finger of the user is recognized. In a case where it is recognized that the contact between the corresponding fingertips is released, the display element for feedback is not displayed.

Note that the display for feedback may be accompanied by the display of a thick frame similarly to the example of FIG. 13.

In a case where the user moves the hand 5 in the horizontal direction in a state where the predetermined fingertips are in contact with each other, the current point marker 41m moves on the horizontal direction gauge 41 in a direction according to the movement direction of the hand by a movement amount according to the movement amount of the hand 5. Furthermore, in a case where the user moves the hand 5 in the vertical direction in the same state, the current point marker 42m moves on the vertical direction gauge 42 in a direction according to the movement direction of the hand by a movement amount according to the movement amount of the hand 5.

In the horizontal direction gauge 41, the center point 41c represents the position of the above-described base point (initial contact position) in the horizontal direction. That is, the position of the hand 5 in the horizontal direction at the time when the contact between the predetermined fingertips of the user is recognized is indicated. The scroll start point 41l and the scroll start point 41r represent the positions separated from the base point by the distance R in the left direction and the right direction, respectively.

Furthermore, in the vertical direction gauge 42, the center point 42c represents the position of the base point in the vertical direction, and the scroll start point 42u and the scroll start point 42d represent the positions separated from the base point by the distance R in the upward direction and the downward direction, respectively.

In a case where the user moves the hand 5 in any of the left and right directions from the base point by an amount exceeding the distance R, the current point marker 41m moves from the center point 41c to a position exceeding any of the scroll start points 41l and 41r, and the map scrolling in the right or left direction is started. Similarly, in the vertical direction, in a case where the user moves the hand 5 in any of the upward and downward directions from the base point by an amount exceeding the distance R, the current point marker 42m moves from the center point 42c to a position exceeding any of the scroll start points 42u and 42d, and the map scrolling in the upward or downward direction is started.

The scroll direction display unit 43 is provided to indicate the scrolling direction at this time (in the present example, the movement direction to the image frame side with respect to the map). FIG. 15 exemplifies a case where the movement in which the movement amounts in the right direction and the upward direction exceed the distance R is performed as the movement of the hand 5 from the base point, and the scrolling direction in the diagonally upward right direction is indicated on the scroll direction display unit 43. In the present example, in a case where the movement amount of the hand 5 exceeds the distance R and the map scrolling is actually started, the scrolling direction is indicated on the scroll direction display unit 43.

For example, by performing feedback as illustrated in FIG. 15, it is possible to improve the operability in a case where the map scrolling as the modification example described in FIG. 14 is performed.

Furthermore, in the above description, an example has been described in which there are nine types by the combinations of the types of contact between the fingertips and the number of contacts, but more types of manipulations can be realized by further extending the combination in the time direction. For example, regarding the contact between the tip of the thumb and the tip of the index finger, it is conceivable to treat that one contact, two contacts, and one contact are continuously performed, as one manipulation. This can be rephrased as a manipulation based on a motion such as keeping rhythm with fingers.

Furthermore, not only continuous contact with the same type of finger but also continuous contact with another finger can be combined to further increase variations in manipulation.

Furthermore, in the above description, the presence or absence of the contact between the fingertips of two fingers is detected as the presence or absence of the contact between the fingertips, but, for example, the presence or absence of the contact between three or more fingertips such as the contact between the fingertips of the thumb, the index finger, and the middle finger may be detected.

Furthermore, in the above description, an example in which the determination on the presence or absence of contact between the fingertips is performed using the silhouette image is described, but the determination on the presence or absence of contact between the fingertips can also be performed using a simplified model of the hand. As a specific method, for example, a method is considered in which a pair of fingers having the shortest separation distance between the fingertips is specified, and in a case where the separation distance between the fingertips is equal to or less than a predetermined threshold, a determination result that the fingertips of the specified pair of fingers are in contact with each other is obtained.

Furthermore, the generation of the silhouette image exemplified in FIG. 8 and the generation of the simplified model of the hand 5 exemplified in FIG. 9 can also be performed on the basis of two-dimensional shape detection information obtained by capturing the shape of the hand 5 in two dimensions, specifically, a captured image of the hand 5 by a camera.

Furthermore, in the above description, the car navigation system has been exemplified as an application destination of the present technology, but the present technology is not limited to application to the car navigation system, and can be applied to various systems that recognize a non-contact manipulation by the motion of the hand 5 and execute processing according to the manipulation.

<7. Summary of Embodiments>

A detection processing device (1) according to the embodiment described above includes a detection processing unit (11a) that inputs shape detection information that is information obtained by capturing a shape of a hand of a user in at least two or more dimensions, and detects a motion of the hand including at least presence or absence of contact between fingertips of the user on the basis of the shape detection information.

For example, bringing the fingertips into contact with each other, such as bringing the fingertips of the thumb and the index finger into contact with each other, can be realized without difficulty for the user and with a small motion of the hand.

Therefore, by detecting the motion of the hand of the user including the presence or absence of contact between the fingertips as in the configuration described above, it is possible to eliminate the need for the user to greatly move the hand or force an unnatural motion in the manipulation, and it is possible to improve the operability for the non-contact manipulation.

Furthermore, in the detection processing device of the embodiment, the detection processing unit uses three-dimensional detection information obtained by capturing the shape of the hand in three dimensions, as the shape detection information.

For the hand of the user, the detection accuracy of the motion of the hand is improved by using the three-dimensional detection information, that is, the detection information obtained by stereoscopically capturing the hand.

Therefore, it is possible to allow smaller motion as the motion of the hand of the user required for the manipulation, to allow easier motion of the hand, and the like, and to improve the operability.

Moreover, in the detection processing device of the embodiment, the detection processing unit detects a combination of fingers of the hand of which fingertips are in contact with each other.

Therefore, it is possible to detect the presence or absence of contact between the fingertips for a combination of a plurality of fingers such as the thumb and the index finger, and the thumb and the middle finger.

Therefore, the number of types of manipulations that can be performed by the motion of the hand can be increased.

Furthermore, in the detection processing device of the embodiment, the detection processing unit detects presence or absence of contact between fingertips of at least a thumb and an index finger of the hand.

The contact between fingertips of the thumb and the other finger is a more natural motion than a case of the contact between the fingertips excluding the thumb, for example, the contact between fingertips of the middle finger and the little finger.

Therefore, the operability can be improved.

Furthermore, in the detection processing device of the embodiment, the detection processing unit detects the number of contacts between the fingertips of the hand.

Therefore, even in the case of the contact between fingers of the same combination, it is possible to treat the contact as another manipulation depending on the difference in the number of contacts.

Therefore, the number of types of manipulations that can be performed by the motion of the hand can be increased.

Moreover, in the detection processing device of the embodiment, the detection processing unit detects the number of contacts between the fingertips of the hand per unit time.

In a case where the time interval of the contacts between the fingertips is too long, it can be said that there is a high possibility that the user does not perform the manipulation based on the number of contacts.

By detecting the number of contacts per unit time as described above, it is possible to appropriately detect a case where the user performs a manipulation based on the number of contacts, and to improve the recognition accuracy of the manipulation.

Furthermore, in the detection processing device of the embodiment, the detection processing unit detects a motion of a palm of the hand.

By detecting the motion of the palm, the motion of the entire hand can be detected.

Therefore, as the non-contact manipulation, a manipulation using the motion of the entire hand such as the movement amount and the movement direction of the entire hand can be allowed.

Furthermore, in the detection processing device of the embodiment, the detection processing unit inputs three-dimensional detection information obtained by capturing the shape of the hand in three dimensions, as the shape detection information, generates a simplified model of the hand on the basis of the input three-dimensional detection information, and detects a motion of the hand on the basis of the simplified model.

The simplified model of the hand is a model in which the configuration of the hand is simply represented by a plurality of predetermined parts such as a fingertip part and various joint parts among the parts constituting the hand and lines connecting the parts.

With such a simplified model of the hand, it is possible to identify a constituent part of the hand such as each finger or palm, and to detect various motions of the hand.

Moreover, in the detection processing device of the embodiment, the detection processing unit inputs three-dimensional detection information obtained by capturing the shape of the hand in three dimensions, as the shape detection information, generates a two-dimensional silhouette image on the basis of the input three-dimensional detection information, and detects presence or absence of contact between the fingertips on the basis of the silhouette image.

The silhouette image means an image obtained by projecting a silhouette of an object in a three-dimensional space on a two-dimensional plane.

According to the configuration described above, the presence or absence of contact between the fingertips can be appropriately detected on the basis of the silhouette shape of the user's hand.

Furthermore, in the detection processing device of the embodiment, the detection processing unit detects presence or absence of contact between the fingertips on the basis of a result obtained by determining whether or not a hollow portion (Po) surrounded by a region of the hand is present in the silhouette image.

It can be said that there is a high possibility that the hollow portion in the silhouette image is formed by the fingertips being in contact with each other.

Therefore, according to the configuration described above, the presence or absence of contact between the fingertips can be appropriately detected.

Furthermore, in the detection processing device of the embodiment, the detection processing unit detects presence or absence of contact between the fingertips on the basis of a size of the hollow portion.

Even in a case where there is a hollow portion, in a case where the size of the hollow portion is small, there is a possibility that the hollow portion is not formed by contact between fingertips.

Therefore, by performing the determination in consideration of the size of the hollow portion as described above, it is possible to improve the detection accuracy for the presence or absence of contact between the fingertips.

Moreover, in the detection processing device of the embodiment, the detection processing unit generates a two-dimensional silhouette image on the basis of the three-dimensional detection information, detects presence or absence of contact between the fingertips on the basis of the silhouette image, and performs processing of identifying fingers of which the fingertips are detected to be in contact with each other, on the basis of the simplified model.

Therefore, for example, it is possible to detect the presence or absence of contact between fingertips on the basis of the silhouette image, and to identify each finger or identify the contact finger on the basis of the simplified model of the hand only in a case where it is detected that the fingertips are in contact with each other.

Therefore, it is possible to prevent the processing for identifying the contact finger from being inadvertently performed in a case where there is no contact between the fingertips, and it is possible to reduce the processing load.

A detection processing method of the embodiment is a detection processing method of inputting shape detection information that is information obtained by capturing a shape of a hand of a user in at least two or more dimensions; and detecting a motion of the hand including at least presence or absence of contact between fingertips of the user on the basis of the shape detection information.

With such a detection processing method, functions and effects similar to functions and effects of the detection processing device of the embodiment described above can be obtained.

Furthermore, an information processing system of the embodiment includes a detection processing unit (11a) that inputs shape detection information that is information obtained by capturing a shape of a hand of a user in at least two or more dimensions, and detects a motion of the hand including at least presence or absence of contact between fingertips of the user on the basis of the shape detection information; and a response processing execution unit (21a) that executes processing according to manipulation input information of the user recognized from information on the motion of the hand detected by the detection processing unit.

Therefore, an information processing system that receives, as a non-contact manipulation, a manipulation that can be realized without difficulty for the user and with a small motion of the hand, and executes processing according to the manipulation is realized.

Therefore, the operability for the non-contact manipulation can be improved.

Note that the effects described in the present specification are merely illustrative and are not limited. Further, additional effects may be obtained.

<8. Present Technology>

Note that the present technology can also employ the following configurations.

(1) A detection processing device including:
a detection processing unit that inputs shape detection information that is information obtained by capturing a shape of a hand of a user in at least two or more dimensions, and detects a motion of the hand including at least presence or absence of contact between fingertips of the user on the basis of the shape detection information.

(2) The detection processing device described in (1),
in which the detection processing unit uses three-dimensional detection information obtained by capturing the shape of the hand in three dimensions, as the shape detection information.

(3) The detection processing device described in (1) or (2),
in which the detection processing unit detects a combination of fingers of the hand of which fingertips are in contact with each other.

(4) The detection processing device described in (3),
in which the detection processing unit detects presence or absence of contact between fingertips of at least a thumb and an index finger of the hand.

(5) The detection processing device described in any one of (1) to (4),
in which the detection processing unit detects a number of contacts between the fingertips of the hand.

(6) The detection processing device described in (5),
in which the detection processing unit detects a number of contacts between the fingertips of the hand per unit time.

(7) The detection processing device described in any one of (1) to (6),
in which the detection processing unit detects a motion of a palm of the hand.

(8) The detection processing device described in any one of (1) to (7),
in which the detection processing unit
inputs three-dimensional detection information obtained by capturing the shape of the hand in three dimensions, as the shape detection information,
generates a simplified model of the hand on the basis of the input three-dimensional detection information, and
detects a motion of the hand on the basis of the simplified model.

(9) The detection processing device described in any one of (1) to (8),
in which the detection processing unit
inputs three-dimensional detection information obtained by capturing the shape of the hand in three dimensions, as the shape detection information,
generates a two-dimensional silhouette image on the basis of the input three-dimensional detection information, and
detects presence or absence of contact between the fingertips on the basis of the silhouette image.

(10) The detection processing device described in (9),
in which the detection processing unit detects presence or absence of contact between the fingertips on the basis of a result obtained by determining whether or not a hollow portion surrounded by a region of the hand is present in the silhouette image.

(11) The detection processing device described in (10),
in which the detection processing unit detects presence or absence of contact between the fingertips on the basis of a size of the hollow portion.

(12) The detection processing device described in (8),
in which the detection processing unit
generates a two-dimensional silhouette image on the basis of the three-dimensional detection information,
detects presence or absence of contact between the fingertips on the basis of the silhouette image, and
performs processing of identifying fingers of which the fingertips are detected to be in contact with each other, on the basis of the simplified model.

(13) A detection processing method including:
inputting shape detection information that is information obtained by capturing a shape of a hand of a user in at least two or more dimensions; and
detecting a motion of the hand including at least presence or absence of contact between fingertips of the user on the basis of the shape detection information.

(14) An information processing system including:
a detection processing unit that inputs shape detection information that is information obtained by capturing a shape of a hand of a user in at least two or more dimensions, and detects a motion of the hand including at least presence or absence of contact between fingertips of the user on the basis of the shape detection information; and
a response processing execution unit that executes processing according to manipulation input information of the user recognized from information on the motion of the hand detected by the detection processing unit.

REFERENCE SIGNS LIST

1 Detection processing device
2 Information processing device
3 Sensor device
4 Display device
4a Display screen
5 Hand
10 Information processing system
11 Calculation unit
11a Detection processing unit
12 Sensor I/F
13 Communication unit
21 CPU
21a Response processing execution unit
Po Hollow portion
41 Horizontal direction gauge
41l, 41r Scroll start point
41c Center point
41m Current point marker
42 Vertical direction gauge
42u, 42d Scroll start point
42c Center point 42m Current point marker
43 Scroll direction display unit

The invention claimed is:

1. A detection processing device comprising:
a memory storing a program, and
at least one processor configured to execute the program to perform operations comprising:
receiving shape detection information that is information obtained by capturing a shape of a hand of a user in at least two dimensions; and
detecting a motion of the hand including a presence or an absence of contact between fingertips of the user on a basis of the shape detection information,
wherein detecting the motion of the hand comprises detecting a plurality of different combinations of a thumb and a plurality of other fingertips of the hand that are in contact with each other per unit time and detecting palm center position information.

2. The detection processing device according to claim 1, wherein the operations further comprise:
using three-dimensional detection information obtained by capturing the shape of the hand in three dimensions, as the shape detection information.

3. The detection processing device according to claim 1, wherein the different combinations of fingertips include a first combination comprising a thumb and an index finger of the hand.

4. The detection processing device according to claim 1, wherein detecting a motion of the hand includes detecting a motion of a palm of the hand.

5. The detection processing device according to claim 1, wherein the operations further comprise:
receiving three-dimensional detection information obtained by capturing the shape of the hand in three dimensions, as the shape detection information;
generating a simplified model of the hand on a basis of the three-dimensional detection information; and
detecting a motion of the hand on a basis of the simplified model.

6. The detection processing device according to claim 5, wherein the operations further comprise:
generating a two-dimensional silhouette image on a basis of the three-dimensional detection information;
detecting presence or absence of contact between the fingertips on a basis of the silhouette image; and
performing processing of identifying fingers of which the fingertips are detected to be in contact with each other, on a basis of the simplified model.

7. The detection processing device according to claim 1, wherein the operations further comprise:
receiving three-dimensional detection information obtained by capturing the shape of the hand in three dimensions, as the shape detection information;
generating a two-dimensional silhouette image on a basis of the three-dimensional detection information; and
detecting the presence or the absence of contact between the fingertips on a basis of the silhouette image.

8. The detection processing device according to claim 7, wherein the operations further comprise:
detecting the presence or the absence of contact between the fingertips on a basis of a result obtained by determining whether or not a hollow portion surrounded by a region of the hand is present in the silhouette image.

9. The detection processing device according to claim 8, wherein the operations further comprise:
detecting the presence or the absence of contact between the fingertips on a basis of a size of the hollow portion.

10. A detection processing method comprising:
inputting shape detection information that is information obtained by capturing a shape of a hand of a user in at least two or more dimensions; and
detecting a motion of the hand including at least a presence or an absence of contact between fingertips of the user on a basis of the shape detection information,
wherein detecting the motion of the hand comprises detecting a plurality of different combinations of a thumb and a plurality of other fingertips of the hand that are in contact with each other per unit time and detecting palm center position information.

11. A non-transitory computer readable medium storing a program, the program being executable by a processor to perform operations comprising:
receiving shape detection information that is information obtained by capturing a shape of a hand of a user in at least two dimensions; and
detecting a motion of the hand including a presence or an absence of contact between fingertips of the user on a basis of the shape detection information,
wherein detecting the motion of the hand comprises detecting a plurality of different combinations of a thumb and a plurality of other fingertips of the hand that are in contact with each other per unit time and detecting palm center position information.

12. The non-transitory computer readable medium according to claim 11, wherein the operations further comprise:
using three-dimensional detection information obtained by capturing the shape of the hand in three dimensions, as the shape detection information.

13. The non-transitory computer readable medium according to claim 11, wherein the different combinations of fingertips include a first combination comprising a thumb and an index finger of the hand.

14. The non-transitory computer readable medium according to claim 11, wherein detecting a motion of the hand includes detecting a motion of a palm of the hand.

15. The non-transitory computer readable medium according to claim 11, wherein the operations further comprise:
receiving three-dimensional detection information obtained by capturing the shape of the hand in three dimensions, as the shape detection information;
generating a simplified model of the hand on a basis of the three-dimensional detection information; and
detecting a motion of the hand on a basis of the simplified model.

16. The non-transitory computer readable medium according to claim 15, wherein the operations further comprise:
generating a two-dimensional silhouette image on a basis of the three-dimensional detection information;
detecting presence or absence of contact between the fingertips on a basis of the silhouette image; and
performing processing of identifying fingers of which the fingertips are detected to be in contact with each other, on a basis of the simplified model.

17. The non-transitory computer readable medium according to claim 11, wherein the operations further comprise:
receiving three-dimensional detection information obtained by capturing the shape of the hand in three dimensions, as the shape detection information;
generating a two-dimensional silhouette image on a basis of the three-dimensional detection information; and detecting the presence or the absence of contact between the fingertips on a basis of the silhouette image.

18. The non-transitory computer readable medium according to claim 17, wherein the operations further comprise:
    detecting the presence or the absence of contact between the fingertips on a basis of a result obtained by determining whether or not a hollow portion surrounded by a region of the hand is present in the silhouette image.

19. The non-transitory computer readable medium according to claim 18, wherein the operations further comprise:
    detecting the presence or the absence of contact between the fingertips on a basis of a size of the hollow portion.

* * * * *